US009799176B1

(12) United States Patent
Baughman et al.

(10) Patent No.: US 9,799,176 B1
(45) Date of Patent: Oct. 24, 2017

(54) ACCESSIBILITY-LAYERED COMMUNICATION SERVICE USING LIGHTHOUSE

(71) Applicant: INTERNATIONAL BUSINESS MACHINES CORPORATION, Armonk, NY (US)

(72) Inventors: Aaron Keith Baughman, Silver Spring, MD (US); Nicholas Albert McCrory, Sacramento, CA (US); David Provan, Acworth, GA (US); Michelle Welcks, Tampa, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/610,883

(22) Filed: Jun. 1, 2017

Related U.S. Application Data

(63) Continuation of application No. 15/233,367, filed on Aug. 10, 2016.

(51) Int. Cl.
G08B 5/36 (2006.01)
H04L 29/06 (2006.01)
G09F 19/00 (2006.01)
H04L 12/58 (2006.01)
G06Q 50/00 (2012.01)

(52) U.S. Cl.
CPC .............. G08B 5/36 (2013.01); G09F 19/00 (2013.01); H04L 51/32 (2013.01); H04L 63/065 (2013.01); G06Q 50/01 (2013.01)

(58) Field of Classification Search
CPC . G08B 5/36; G08F 19/00; G08F 19/22; G08F 19/226; H04L 51/32; H04L 63/065
See application file for complete search history.

(56) References Cited

U.S. PATENT DOCUMENTS

| 6,417,797 | B1 | 7/2002 | Cousins et al. |
|---|---|---|---|
| 7,069,520 | B2 | 6/2006 | Bobrow et al. |
| 9,131,107 | B2 | 9/2015 | Kundu et al. |
| 2006/0247514 | A1 | 11/2006 | Panasyuk et al. |
| 2008/0297587 | A1 | 12/2008 | Kurtz et al. |
| 2009/0318815 | A1 | 12/2009 | Barnes et al. |
| 2014/0281579 | A1 | 9/2014 | Trachtenberg et al. |

OTHER PUBLICATIONS

Holmes, Kevin, "Expressing Emotions as a Monumental Light Display", [retrieved on Jul. 20, 2016]. Retrieved from the Internet <URL: http://thecreatorsproject.vice.com/blog/jennifer-wen-mas-nature-and-man-in-rhapsody-of-light-at-the-ovater-cube>, Jul. 12, 2013, 9 pgs.

(Continued)

Primary Examiner — Curtis Odom
(74) Attorney, Agent, or Firm — Christopher K. McLane; Hye Jin Lucy Song; Heslin Rothenberg Farley & Mesiti PC

(57) ABSTRACT

Methods, computer program products, and systems are presented. The methods include, for instance: providing social media feed cognizant lighthouse display service for communicating to spectators, information in regard to social response to an event, the lighthouse display service by use of a lighthouse structure further including a private display for subscribed data for an accessibility-layered communication service as encoded with a private key to make inaccessible to the spectators but to be decoded on a user device with the private key.

20 Claims, 6 Drawing Sheets

(56) References Cited

OTHER PUBLICATIONS

Tsagkatakis, et al., "Sparse Signal Processing Technologies for HyperSpectral Imaging Systems . . . D2.2 Scenario descriptions and system requirements", Grant Agreement No. 640174, PHySIS, Jun. 30, 2015, 56 pgs.

Behrens, Moritz, "The Sentiment Cocoon", Media Architecture—Urban IXD—Research, [retrieved on Jul. 20, 2016]. Retrieved from the Internet <URL: http://moritzbehrens.com/2015/sentiment-cocoon/>, 7 pgs.

Scott, Hunter, "Visualizing the emotions of a city", [retrieved Jul. 20, 2016]. Retrieved from the Internet <URL: http://www.hscott.net/the-emotional-city/>, Jan. 19, 2015, 5 pgs.

De Melo, et al., "Expression of Emotions in Virtual Humans Using Lights, Shadows, Composition and Filters", IST—Technical University of Lisbon and INESC-ID, Av. Prof. Cavaco Silva, Taguspark, 2780-990, Port Salvo, Portugal, pp. 549-560.

"TRUECar—Event Experience", [retrieved Jul. 20, 2016]. Retrieved from the Internet <URL: http://www.affectiva.com/company/case-studies/true-car-l-e-d/>, 4 pgs.

"Emotional Intelligence Technology to Light Up Santa Monica at 2015 Twilight Concert Series at the Pier", [retrieved Jan. 20, 2016]. Retrieved from the Internet <URL: http://techzulu.com/emotional-intelligence-technology-to-light-up-santa-monica-at-2015-twilight-concert-series-at-the-pier/>, Jul. 28, 2015, 2 pgs.

Lanman, et al., "Build Your Own Glasses-free 3D Display", MIT Media Lab, SIGGRAPH 2011, Aug. 8, 2011, 100 pgs.

Swamy, et al., "Reduction and estimation of hyperspectral imagery using dual tree wavelet filter bank analysis with an orthogonal subspace projection approach", International Conference and Workshop on Emerging Trends in Technology (ICWET 2011)—TCET, Mumbai, India, pp. 959-960.

Lin, et al., "Parametric projection pursuit for dimensionality reduction of hyperspectral data", Geoscience and Remote Sensing Symposium, 2003, IGARSS '03, Proceedings, 2003 IEEE International, Jul. 2003, pp. 3483-3485, vol. 6., 2 pgs.

Chen, et al., "Point Cloud Encoding for 3D Building Model Retrieval", Oct. 21, 2013, IEEE Transactions on Multimedia, vol. 16, No. 2, Feb. 2014, pp. 337-345.

Mell, Peter, "The NIST Definition of Cloud Computing", NIST Special Publication 800-145, Sep. 2011, Gaithersburg, MD, 6 pgs.

Anonymous, "Remote Health Sensing for Mobile Telepresence Devices", IP.com, IP.com No. IPCOM000236337D, Apr. 21, 2014, 4 pgs.

List of IBM Patents or Applications Treated as Related, Jun. 1, 2017, pp. 1-2.

"Accessibility-Layered Communication Service Using Lighthouse", U.S. Appl. No. 15/233,367, filed Aug. 10, 2016, pp. 1-39.)

Office Action entered in U.S. Appl. No. 15/233,367, dated Jan. 25, 2017, 11 pgs.

Notice of Allowance entered in U.S. Appl. No. 15/233,367, dated May 1, 2017, 7 pgs.

ACCESSIBILITY-LAYERED COMMUNICATION SERVICE USING LIGHTHOUSE

TECHNICAL FIELD

The present disclosure relates to communication by use of a beacon, and more particularly to methods, computer program products, and systems for delivery of distinctive visual information respective to the public and subscribed users.

BACKGROUND

In conventional public communication environment, information is delivered much later than an event for the delay to produce the news, and means to access the offered information such as communication devices and access to the communication channel, etc., are required for the audience. Accordingly, big data in regard to public opinion on the event represented as social media responses may not be easily shared in real time due to limited access to the means. Further, when normal communication channels are not available, critical information that are urgently to be shared may not be distributed in real time. At the same time, as publicly distributed information is indiscriminately available for everybody, reaching to a targeted audience with privileged information cannot be achieved with such public communication.

SUMMARY

The shortcomings of the prior art are overcome, and additional advantages are provided, through the provision, in one aspect, of a method. The method for providing an accessibility-layered communication service includes, for example: obtaining, by one or more processor of a lighthouse server, social media input and event input, respectively associated with an event; adjusting a time zone associated with the social media input based on ascertaining that the social media input is not synchronized with a progression of the event; creating a public display control message for a lighthouse structure by tuning the obtained social media input and the event input as configured for a public display of the event, the public display being intended for spectators, wherein the lighthouse structure broadcasts the public display based on the public display control message; generating a private display control message for the lighthouse structure by spectrographically encoding subscribed data for the accessibility-layered communication service by use of a private key, as configured for a private display of the subscribed data, the private display being intended for a user and being inaccessible to the spectators, wherein the lighthouse structure broadcasts the private display based on the private display control message; and sending the public display control message and the private display control message to the lighthouse structure such that the multi-layered information comprising the public display and the private display is delivered to respectively intended audiences.

obtaining, by one or more processor of a lighthouse server, social media input and event input, respectively associated with an event; adjusting a time zone associated with the social media input based on ascertaining that the social media input is not synchronized with a progression of the event; creating a public display control message for a lighthouse structure by tuning the obtained social media input and the event input as configured for a public display of the event, the public display being intended for spectators, wherein the lighthouse structure broadcasts the public display based on the public display control message; generating a private display control message for the lighthouse structure by encoding subscribed event details from the event input by use of a private key, as configured for a private display of the event, the private display being intended for a user and being inaccessible to the spectators, wherein the lighthouse structure broadcasts the private display based on the private display control message; and sending the public display control message and the private display control message to the lighthouse structure such that the multi-layered information including the public display and the private display is delivered to respectively intended audiences.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
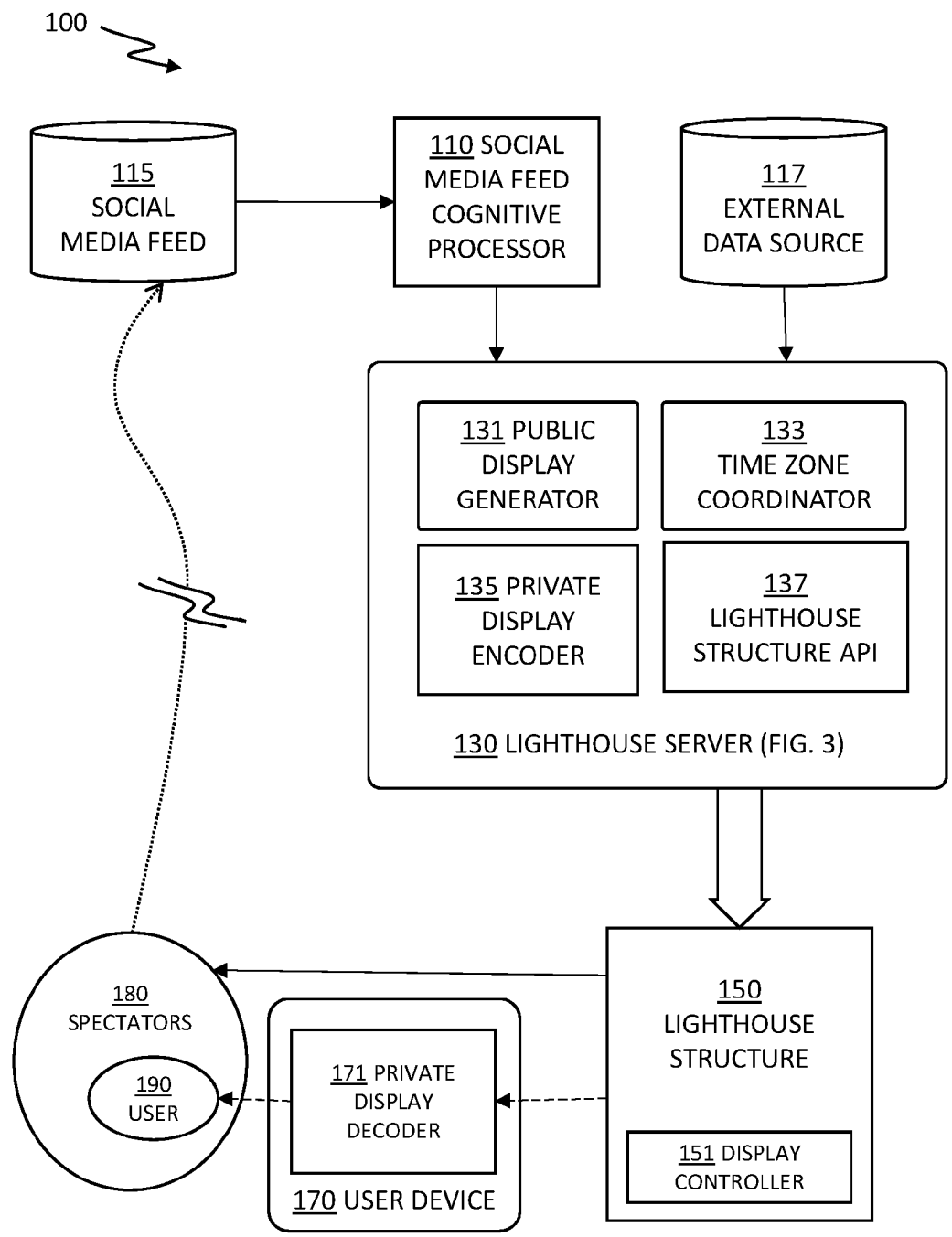
FIG. 1 depicts a lighthouse environment to provide a lighthouse display service by use of a lighthouse server, in accordance with one or more embodiments set forth herein.

FIG. 1 depicts a lighthouse environment 100 to provide a lighthouse display service by use of a lighthouse server 130, in accordance with one or more embodiments set forth herein.

The lighthouse environment 100 includes a social media feed cognitive processor 110, a social media feed 115, an external data source 117, the lighthouse server 130, and a lighthouse structure 150.

The social media feed cognitive processor 110 obtains the social media feed 115 on an event of interest in real time and determines a tone toward the event as expressed in the social media feed 115, by use of cognitive computing services to process the social media feed 115 in natural language and to analyze tones expressed. The social media feed 115 may originate from spectators 180 who observe the lighthouse structure 150, or from remote audiences who may respond to the event but are not able to see the lighthouse structure 150, as represented by a discontinuous dotted arrow from the spectators 180 to the social media feed 115. The external data source 117 is a source of additional information on the event that is input to the lighthouse server 130. Examples of the event may be any generally popular events such as an award ceremony, a sports tournaments, etc.

In one embodiment of the present invention, the social media feed cognitive processor 110 is implemented by use of Bluemix® utilizing IBM Watson™ cognitive computing services such as Tone Analyzer, and the social media feed 115 is implemented by Cloudant® (Bluemix and Cloudant are registered trademarks, and IBM Watson is a trademark of the International Business Machines Corporation in the United States and other countries). In one embodiment of the present invention, the social media feed 115 is Tweet conversations on the social media Twitter.

Inputs from the social media feed cognitive processor 110 to the lighthouse server 130 includes social media tones and respective volumes. The inputs are provided repeatedly in real time according to a predefined refresh rate, during the period of the lighthouse display service. In the same embodiment of the present invention wherein the social media feed 115 is Tweets, the social media feed cognitive processor 110 produces the tone inputs for the lighthouse server 130 by processing the Tweets, and respective count of Tweets processed. In the same embodiment, the tone inputs may be a combination of an emotional tone, a social tone, and a writing style tone, by use of IBM Watson Tone Analyzer service. In the same embodiment, the emotional tone may be selected from {anger, disgust, fear, joy, sadness}, the social tone may be selected from {openness, conscientiousness, extraversion, agreeableness, and emotional range}, and the writing style tone may be selected from {confident, analytical, and tentative}. Inputs from the external data source 117 may include details of the event on which the social media tones are collected, such as nominees for and a winner of an award in the award ceremony, a scoreboard of a match in the sports tournaments, etc.

The lighthouse server 130 includes a public display generator 131, a time zone coordinator 133, a private display encoder 135, and a lighthouse structure application programming interface (API) 137. The public display generator 131 in the lighthouse server 130 creates a public display in visible spectrum to be exhibited on the lighthouse structure 150 by processing the social media inputs obtained from the social media feed cognitive processor 110 as well as event input from the external data source 117. The public display may be preconfigured for a customer who provides the lighthouse display service according to a service agreement, applicable laws, and the lighthouse structure API 137. The customer of the lighthouse display service may be a commercial entity promoting the event and/or a product in relation to the event, a government agency establishing an alternative emergency communication channel for the event related to an urgent crisis response, criminal investigations, etc. The message/news intended for the spectators 180 may be provided to the lighthouse server 130 via the external data source 117.

The time zone coordinator 133 in the lighthouse server 130 adjusts time zones represented in the social media inputs for the public display on the lighthouse structure 150 based on a time gap between the event location and the location of the lighthouse structure 150, between a real time progression of the event and a local broadcast schedule of the event, or between the real time progression of the event and the social media feed based on originating locations of the social media feed, etc. The private display encoder 135 in the lighthouse server 130 creates a private display by spectrographically encoding subscribed event details by use of a private key. The subscribed event details is not available in the public display, and should be decoded for a user 190 by use of the private key. The public display of the lighthouse display service is intended for the spectators 180, and the private display of the lighthouse display service is intended for the user 190. The public display and the private display are layered in accessibility of the information and have aforementioned respective target audiences, although both are simultaneously broadcasted from the lighthouse structure 150. The lighthouse structure API 137 in the lighthouse server 130 is used in outputs of the public display and the private display to properly interface with the lighthouse structure 150 such that the outputs of lighthouse server 130 may be displayed as intended on the lighthouse structure 150.

The lighthouse structure 150 is a tall building or any visually outstanding structure equipped with a visual display equipment such as screens, light boards, strobes, sparkle lightings, etc. The lighthouse structure 150 may also have means for transmitting signals for the private display that is hyperspectral and invisible to the spectators 180. The lighthouse structure 150 include a display controller 151 that manipulates the visual display equipment and signal transmitter according to the public display control message and the private display control message received from the lighthouse server 130. The public display control message may include a sentiment display as processed by the public display generator 131, a volume of the social media feed 115 associated with the sentiment display, and an event announcement. The private display control message may include subscribed event details, provided by the customer to the user 190 according to a service agreement for the lighthouse display service.

The public display on the lighthouse structure 150 is visible to anybody within the visibility distance and has a line of sight, as noted by spectators 180. The public display is represented as a solid arrow coming out of the lighthouse structure 150 and reaching the spectators 180. The user 190 who subscribes to the lighthouse display service uses a user device 170 including a private display decoder 171 configured to decode a private display by use of the private key. The signals for the private display are transmitted from the lighthouse structure 150 but not via a visible spectrum, such that only the user 190, by use of the user device 170 and the private key, may see the private display. The private display is represented as a dashed arrow coming out of the lighthouse structure 150, via the user device 170, and to the user 190. An example of the user device 170 may be an eyewear type wearable device through which the user 190 may look at the lighthouse structure 150 such that the private display in a hyperspectral bandwidth may be made visible for the user 190, by decoding the hyperspectral image with the private key. Another example of the user device 170 may be a combination of a receiver and a screen, wherein the receiver captures hyperspectral images of the private display and exhibits the private display as decoded in visible bandwidth such that the user 190 may access the private display when the user 190 points the receiver of the user device 170 to the lighthouse structure 150 and looks at the screen of the user device 170, wherein the private key is shared with the user device 170.

In the lighthouse environment, the customer of the lighthouse display service may communicate cognitive information, particularly a public opinion on the event represented in the social media feed 115, in real time to the spectators 180. When the event is very popular to the extent that everyone wants the latest news, the spectators 180 may check what is happening and how other members of society responds to the event by simply looking at the lighthouse structure 150, without using their mobile communication service. The public display of the lighthouse display service is available without any means, services, or regular communication channels, and open to all. The public display of the lighthouse display service may also visually alert everyone about a weather event, a public safety event, etc.

Further, by transmitting the encoded private display, the user 190 may access to the subscribed event details by use of the user device 170 and the private key. The lighthouse display service may be used as an alternative communication channel, because of the ease of access, regardless of whether or not the spectators 180, including the user 190, have access to a regular communication channel such as radio frequencies, the Internet, a local Wi-Fi network, etc. Without requiring any means to access the regular communication channel, such as a radio transceiver to communicate over the radio frequencies, a smart device to access the Internet, or a Wi-Fi enabled devices to access the Wi-Fi network, the lighthouse display service is available to anyone who looks at the lighthouse structure 150, and with the user device 170 and the private key, the user 190 has access to the private display additional to the publicly available information. The lighthouse display service may support more than one private display for respective users identified by respective private keys and respective user devices, by encoding a desired number of private displays and transmitting them with the public display. The lighthouse display service may further be utilized for a cognitive navigation corresponding to a personality type of the user 190, by identifying the user 190 and selecting recommended destinations/routes that had been well accepted by users having the same personality type, etc. The lighthouse server 130 may obtain navigation data for the user 190 via the external data source 117, and encode the navigation data as a hyperspectral private display before sending to the lighthouse structure 150 for exhibition. In other embodiment of the present invention, the private display may be based on the proximity of the user 190 to the lighthouse structure 150, or may be shown in a dedicated viewing board in a visible spectrum. For example, when the public display of the lighthouse display service visually alerts everyone about a public safety event, first responders and/or law enforcement personnel may receive details about the same public safety event such as a location of the event, a physical description of a person of interest, etc., by use of their respective private key and the user devices.

Figure 2:
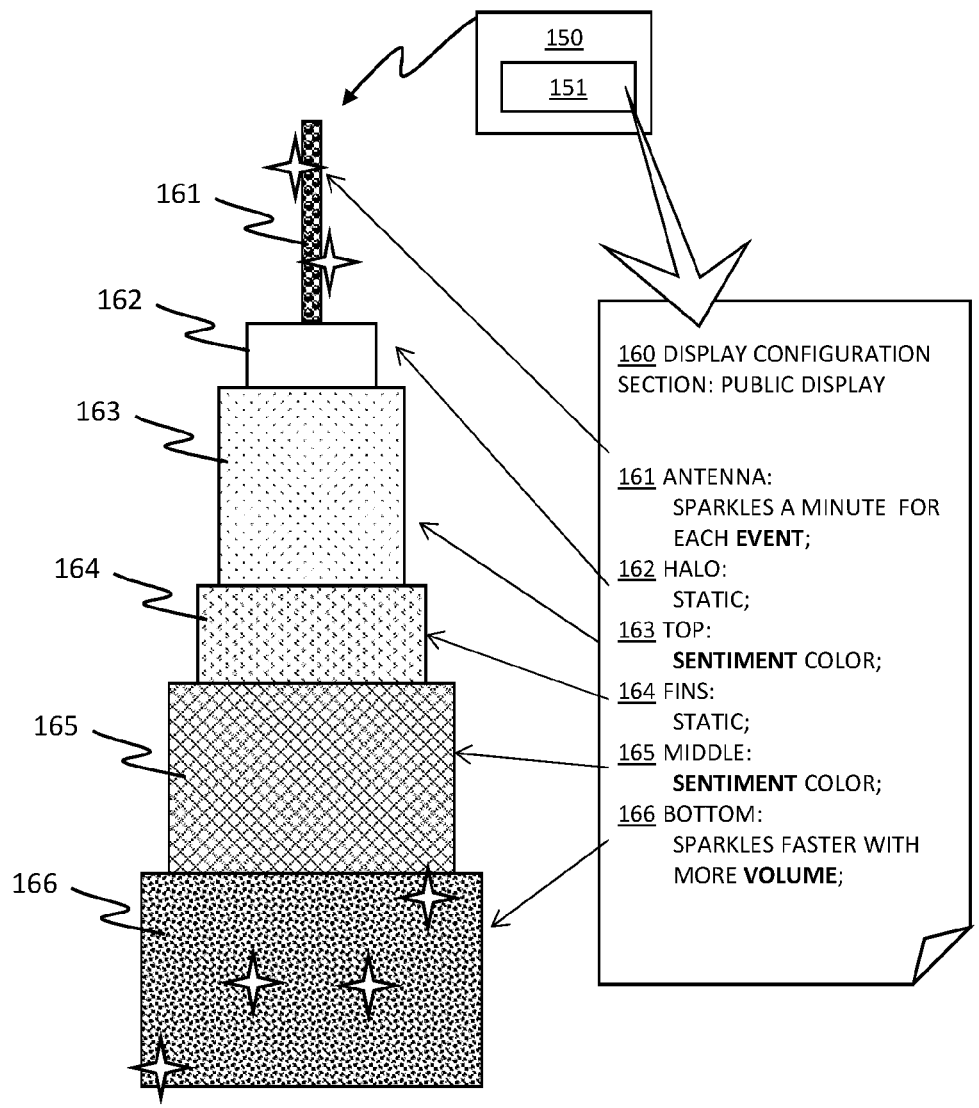
FIG. 2 depicts an exemplary display configuration used by the display controller of the lighthouse structure, in accordance with one or more embodiments set forth herein.

FIG. 2 depicts an exemplary display configuration 160 used by the display controller 151 of the lighthouse structure 150, in accordance with one or more embodiments set forth herein.

The display controller 151 uses the exemplary display configuration 160 and the inputs from the lighthouse server 130 to control the public display of the lighthouse structure 150. As the lighthouse server 130 uses the lighthouse structure API 137 in creating the public display control message, the display controller 151 may easily translate the inputs from the lighthouse server 130 to a physical display on the lighthouse structure 150.

In the example of FIG. 2, the event for the lighthouse display service is an awards ceremony that is very popular, with particular local interests. Thus the lighthouse display service is exhibited on a local landmark building, which is a skyscraper that may be easily seen over a great distance in the area. The display configuration 160 is defined for respective sections of the lighthouse structure 150, including an antenna section 161, a halo section 162, a top section 163, fins section 164, a middle section 165, and a bottom section 166. The antenna section 161 is configured to sparkle for a minute each time a designated event occurs. The designated event may be, an announcement of a winner of an award, etc. The halo section 162, and the fins section 164 are configured to exhibit a fixed color independent of the inputs. The top section 163 and the middle section 165 are configured to exhibit a sentiment color according to the sentiment display portion of the public display. The bottom section 166 is configured to sparkle in a frequency proportional to the volume of the social media feed 115 as relayed by the lighthouse server 130. In the example of FIG. 2, the public display control message is refreshed for every occurrence of the designated event, a change in the sentiment color, and a change in the volume of the social media feed, which will be reflected as a change in the public display on the lighthouse structure 150. In the same example, the private display control message may also be sent for additional event information such as nominees for each award, names of the winners, winners' acceptance speeches, etc.

Figure 3:
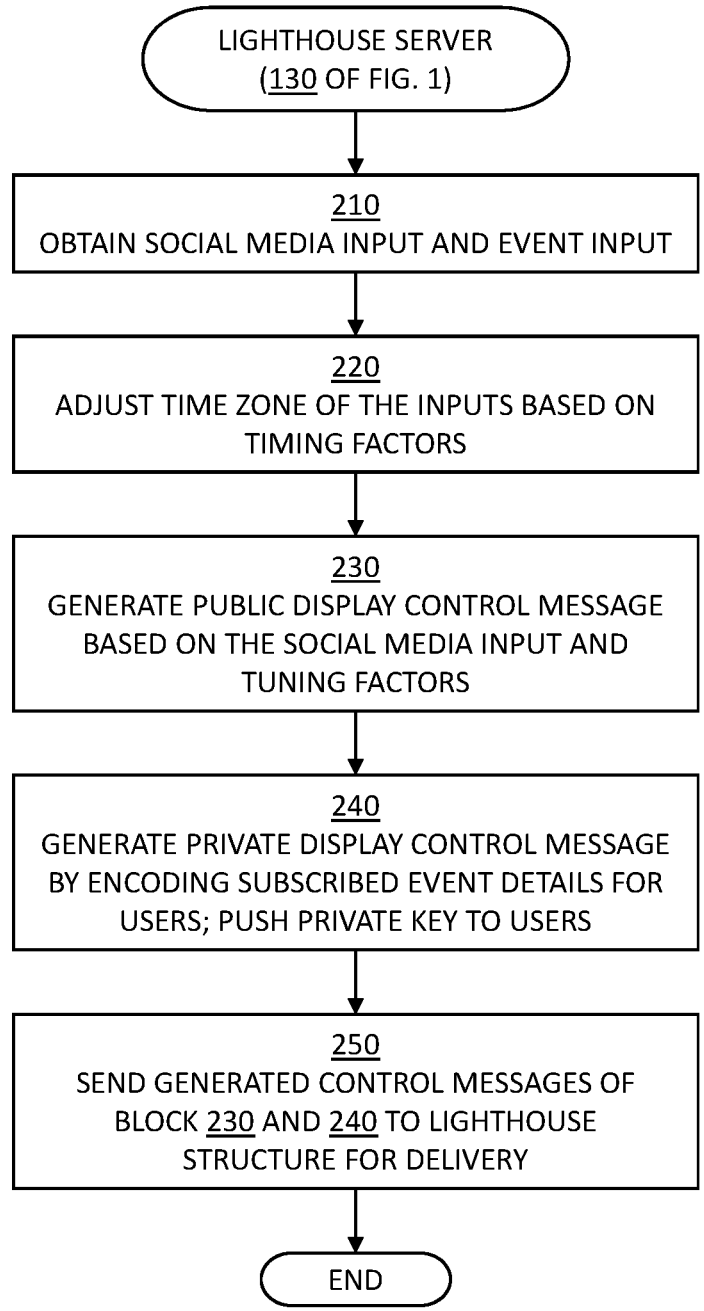
FIG. 3 depicts a flowchart for the lighthouse server, in accordance with one or more embodiments set forth herein.

FIG. 3 depicts a flowchart for the lighthouse server 130 of FIG. 1, in accordance with one or more embodiments set forth herein.

During the period of the lighthouse display service as agreed by the customer, the lighthouse display service provider, the lighthouse structure, etc., blocks 210 through 250 may be iterated for each input from either the social media feed cognitive processor 110 or the external data source 117, and/or for each refresh period for both the public display and the private display.

In block 210, the lighthouse server 130 obtains social media inputs from the social media feed cognitive processor 110 and event inputs from the external data source 117, in order to provide a lighthouse display service on an event. The social media input from the social media feed cognitive processor 110 includes a social media tone and a volume corresponding to the social media tone. The social media tone input may be a combination of emotions, social propensities, and writing styles as expressed in the social media feed 115 on the event, and the volume indicates the counts of the social media feed 115 about the event. The event inputs from the external data source 117 include additional information about the event as intended by a customer of the lighthouse display service for subscribed users. As noted, the event inputs are used to be delivered to a group of users have access to a private display of the lighthouse display service, or to trigger changes in a public display of the lighthouse display service. Then the lighthouse server 130 proceeds with block 220.

In block 220, the lighthouse server 130 adjusts time zones of the inputs to synchronize, if necessary, the social media feed with the progression of the event. For example, the event may be broadcasted in four (4) different time zones according to respective local time, and the social media feed 115 may be coordinated based on locations originating the social media feed 115, provided that the social media feed 115 is based on the local broadcast of the event. Or even if the local broadcasting schedules are delayed based on time zones, some social media users may already know about live progression of the event via other media such as social media postings and live streaming of the event over the Internet. Accordingly, the lighthouse server 130 may coordinate time zone of the inputs based on the numerous factors, including the location of the event, the location of the lighthouse structure 150, local broadcasting schedules of the event, availability of the live streaming of the event, etc. In one embodiment of the present invention wherein the locality of the numerous factors are of no concern to the public, or the lighthouse display service may simply replay a past event, the lighthouse server may skip block 220 for the lighthouse display service for the event. Then the lighthouse server 130 proceeds with block 230.

In block 230, the lighthouse server 130 generates a public display control message by analyzing the social media inputs and the event inputs obtained in block 210. The lighthouse server 130 aggregates the social media inputs addressing complex analysis on numerous ton factors into simplified categories that are suitable for public exhibition as desired by the customer of the lighthouse display service. In the embodiment of FIG. 2, the public display includes a sentiment display, a volume display, and an event display. The sentiment display may be a sentiment color as determined by analyzing the social media tone input, a combination of emotions, social propensities, and writing styles, which results in distinctive colors respectively corresponding to simplified categories of {POSITIVE, NEGATIVE, NEUTRAL, AMBIVALENT}, and a manner of exhibiting the sentiment color suitable for the lighthouse structure 150, as in lighting up the top section and the middle section of the lighthouse structure 150 with the sentiment color. In the same embodiment, the volume display is a manner of exhibiting the volume, as a number of sparkles in proportion to the volume on the bottom section of the lighthouse structure 150, and the event display is a manner of exhibiting a predetermined event, as in sparkling for a minute on the antenna section of the lighthouse structure 150 every time an award is announced. Then the lighthouse server 130 proceeds with block 240.

In block 240, the lighthouse server 130 generates a private display control message by encoding subscribed event details from the event input of block 210 for the users by use of a private key, which is shared with the users to access the private display. The lighthouse server 130 pushes the private key to the user device 170 such that the users may automatically receive the private key in a timely manner to decode the private display including the subscribed event details. Then the lighthouse server 130 proceeds with block 250.

In block 250, the lighthouse server 130 sends the lighthouse display control messages, including the public display control message generated in block 230 and the private display control message generated in block 240, to the display controller 151 of the lighthouse structure 150 to exhibit the lighthouse display. Then the lighthouse server 130 completes a processing cycle of the input obtained in block 210.

Subsequent to block 250, the display controller 151 exhibits the public display and transmits the private display according to the public display control message and the private display control message sent from the lighthouse server 130.

Certain embodiments of the present invention may offer various technical computing advantages, including a communication framework publicly delivering multiple streams of information without requiring either a receiver device on the audience or conventional communication channels. Accordingly, the same embodiments of the present invention greatly improve public communication ability in an emergency as well as reinforce conventional communication networks by providing an alternative channel. Certain embodiments of the present invention implement sharing cognitive information in real time with public audience by visual display as well as with targeted audiences by encoded hyperspectral images. Further, certain embodiments of the present invention may improve security of the communication with the targeted audiences by employing a private key and a decoder for the encoded hyperspectral images, because only a user having both the private key and the decoder may access the encoded hyperspectral images.

Figure 4:
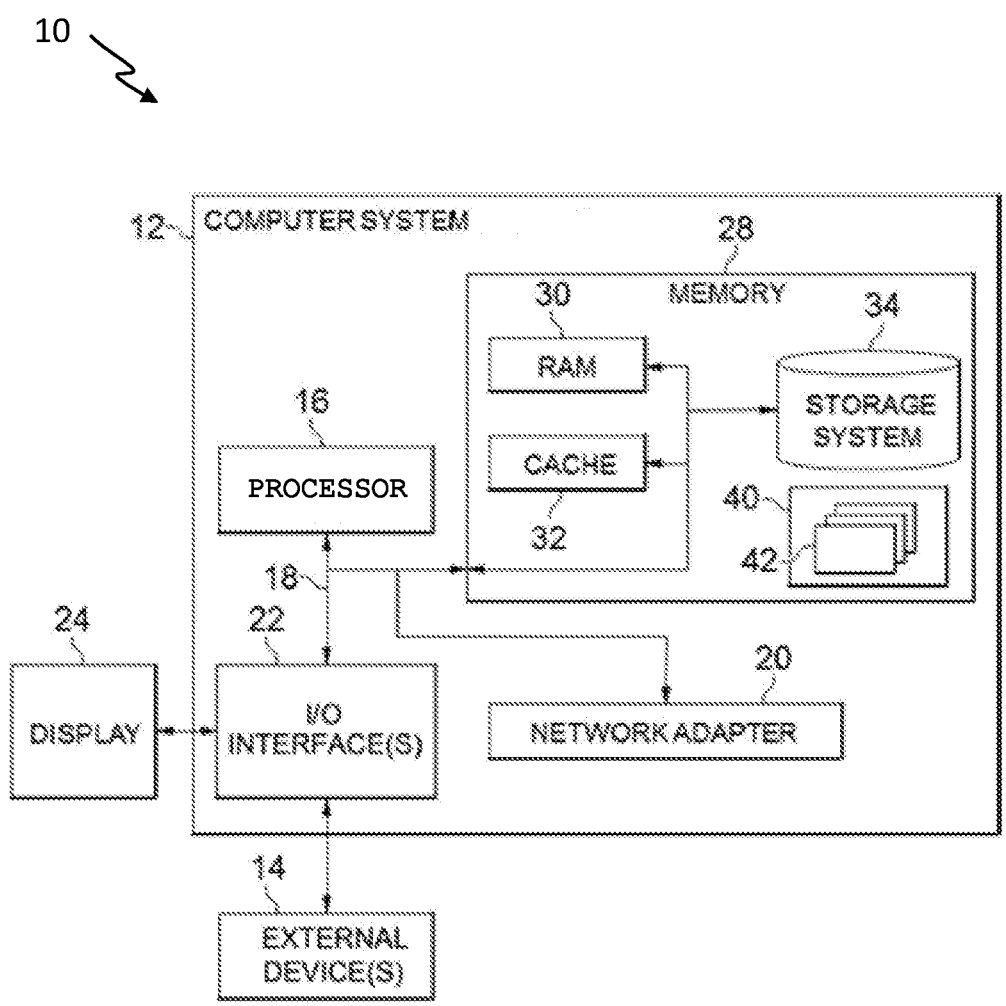
FIG. 4 depicts a cloud computing node according to an embodiment of the present invention.
Figure 5:
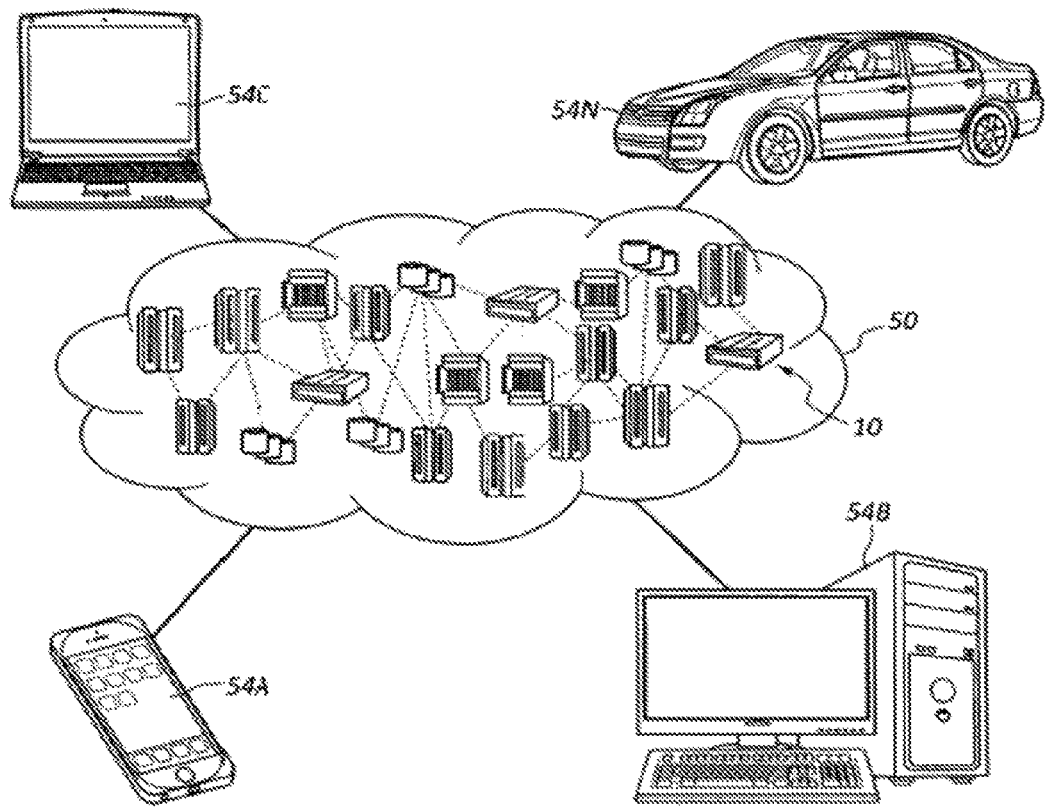
FIG. 5 depicts a cloud computing environment according to an embodiment of the present invention.
Figure 6:
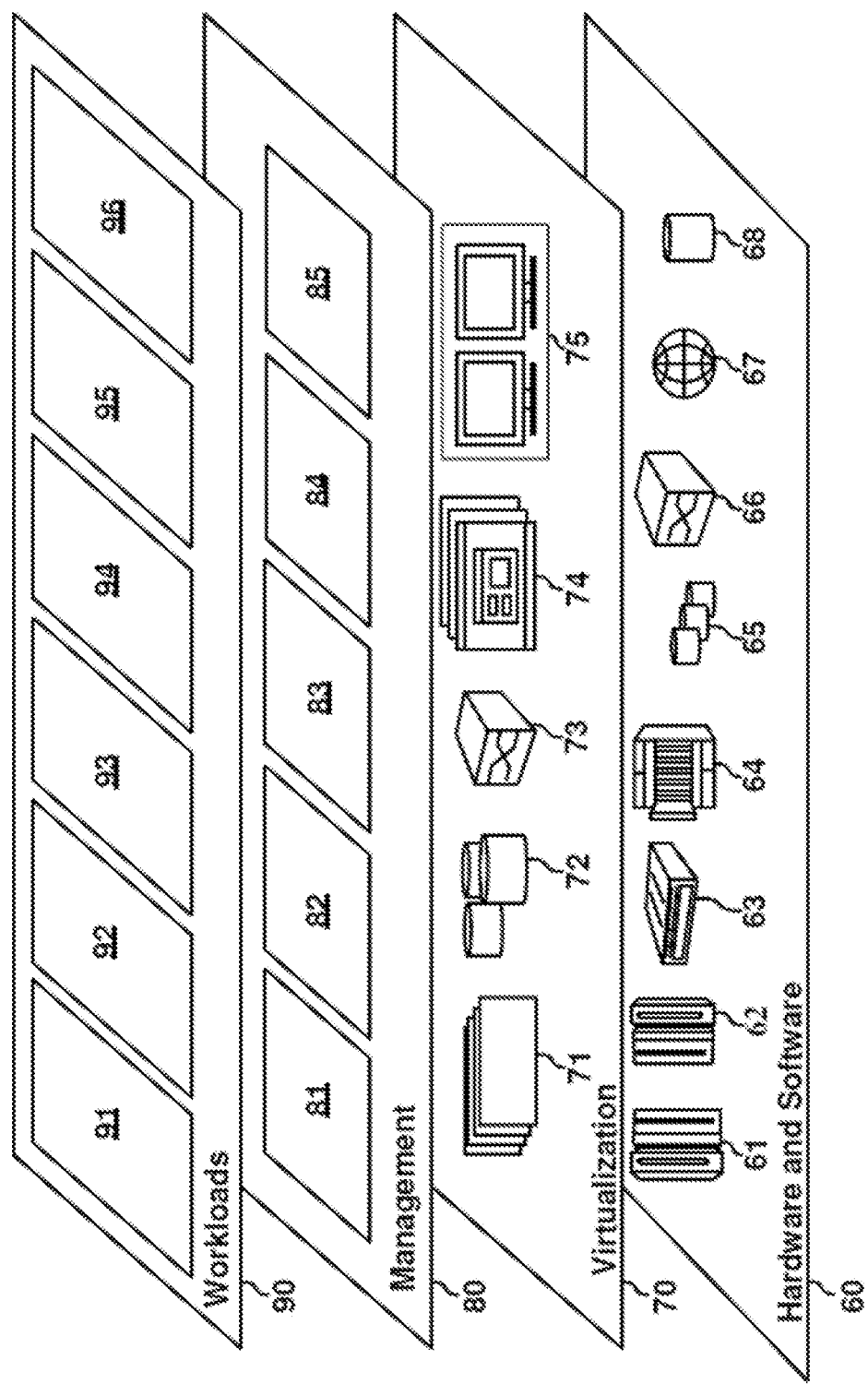
FIG. 6 depicts abstraction model layers according to an embodiment of the present invention.

FIGS. 4-6 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 4, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the lighthouse server 130 of FIG. 1. Program processes 42, as in the flowchart of FIG. 3, describing processes of the lighthouse server 130, generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/

Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the lighthouse server 96, as described herein. The processing components 96 can be understood as one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method for providing an accessibility-layered communication service, comprising:
   obtaining, by one or more processor of a lighthouse server, social media input and event input, respectively associated with an event;
   adjusting a time zone associated with the social media input based on ascertaining that the social media input is not synchronized with a progression of the event;
   creating a public display control message for a lighthouse structure by tuning the obtained social media input and the event input as configured for a public display of the event, the public display being intended for spectators, wherein the lighthouse structure broadcasts the public display based on the public display control message;
   generating a private display control message for the lighthouse structure by spectrographically encoding subscribed data for the accessibility-layered communication service by use of a private key, as configured for a private display of the subscribed data, the private display being intended for a user and being inaccessible to the spectators, wherein the lighthouse structure broadcasts the private display based on the private display control message; and sending the public display control message and the private display control message to the lighthouse structure such that the multi-layered information comprising the public display and the private display is delivered to respectively intended audiences.

2. The computer implemented method of claim 1, wherein the subscribed data for the accessibility-layered communication service configured for the private display may be selected from a message to the user, cognitive navigation data for the user recommending destinations/routes well accepted by other users having the same personality type as the user, subscribed event details from the event input, and combinations thereof.

3. The computer implemented method of claim 1, further comprising:

receiving, by another processor of a display controller for the lighthouse structure, the public display control message and the private display control message responsive to the sending; and broadcasting the public display and the private display based on respective display configuration customized for the lighthouse structure.

4. The computer implemented method of claim 1, wherein the lighthouse structure is equipped with a plurality of visual display equipment for the public display and a signal transmitter for the private display, the visual display equipment selected from a screen, a light board, a strobe, a sparkle lighting, and combinations thereof.

5. The computer implemented method of claim 1, further comprising:

accepting, by a processor of a user device for the user, the private key responsive to pushing the private key to the user device by the lighthouse server;

acquiring the private display responsive to broadcasting of the private display by the lighthouse structure; and decoding the private display by use of the private key such that the private display is made accessible for the user.

6. The computer implemented method of claim 5, wherein the user device may be an eyewear type wearable device through which the user looks at the lighthouse structure in order to see the private display in a hyperspectral bandwidth that is not visible without the user device, a set of a receiver and a screen, wherein the receiver captures hyperspectral images of the private display and exhibits the private display as decoded in visible bandwidths for the user, and combinations thereof.

7. The computer implemented method of claim 1, wherein the event is a public safety event, the public display alerts the event in a visible spectrum for the spectators and users, the users may include first responders and/or law enforcement personnel, and the private display informs details of the event to the users that may include a location of the event, a physical description of a person of interest, and combinations thereof.

8. A computer program product comprising:

a non-transitory computer storage medium readable by one or more processor and storing instructions for execution by the one or more processor for performing a method for providing an accessibility-layered communication service, comprising:

obtaining, by the one or more processor of a lighthouse server, social media input and event input, respectively associated with an event;

adjusting a time zone associated with the social media input based on ascertaining that the social media input is not synchronized with a progression of the event;

creating a public display control message for a lighthouse structure by tuning the obtained social media input and the event input as configured for a public display of the event, the public display being intended for spectators, wherein the lighthouse structure broadcasts the public display based on the public display control message;

generating a private display control message for the lighthouse structure by spectrographically encoding subscribed data for the accessibility-layered communication service by use of a private key, as configured for a private display of the subscribed data, the private display being intended for a user and being inaccessible to the spectators, wherein the lighthouse structure broadcasts the private display based on the private display control message; and sending the public display control message and the private display control message to the lighthouse structure such that the multi-layered information comprising the public display and the private display is delivered to respectively intended audiences.

9. The computer program product of claim 8, wherein the subscribed data for the accessibility-layered communication service configured for the private display may be selected from a message to the user, cognitive navigation data for the user recommending destinations/routes well accepted by other users having the same personality type as the user, subscribed event details from the event input, and combinations thereof.

10. The computer program product of claim 8, further comprising:

receiving, by another processor of a display controller for the lighthouse structure, the public display control message and the private display control message responsive to the sending; and broadcasting the public display and the private display based on respective display configuration customized for the lighthouse structure.

11. The computer program product of claim 8, wherein the lighthouse structure is equipped with a plurality of visual display equipment for the public display and a signal transmitter for the private display, the visual display equipment selected from a screen, a light board, a strobe, a sparkle lighting, and combinations thereof.

12. The computer program product of claim 8, further comprising:

accepting, by a processor of a user device for the user, the private key responsive to pushing the private key to the user device by the lighthouse server;

acquiring the private display responsive to broadcasting of the private display by the lighthouse structure; and decoding the private display by use of the private key such that the private display is made accessible for the user.

13. The computer program product of claim 12, wherein the user device may be an eyewear type wearable device through which the user looks at the lighthouse structure in order to see the private display in a hyperspectral bandwidth that is not visible without the user device, a set of a receiver and a screen, wherein the receiver captures hyperspectral images of the private display and exhibits the private display as decoded in visible bandwidths for the user, and combinations thereof.

14. The computer program product of claim 8, wherein the event is a public safety event, the public display alerts the event in a visible spectrum for the spectators and users, the users may include first responders and/or law enforcement personnel, and the private display informs details of the event to the users that may include a location of the event, a physical description of a person of interest, and combinations thereof.

15. A system comprising:

a memory;

one or more processor in communication with memory; and program instructions executable by the one or more processor via the memory to perform a method for providing an accessibility-layered communication service, comprising:

obtaining, by the one or more processor of a lighthouse server, social media input and event input, respectively associated with an event;

adjusting a time zone associated with the social media input based on ascertaining that the social media input is not synchronized with a progression of the event;

creating a public display control message for a lighthouse structure by tuning the obtained social media input and the event input as configured for a public display of the event, the public display being intended for spectators, wherein the lighthouse structure broadcasts the public display based on the public display control message;

generating a private display control message for the lighthouse structure by spectrographically encoding subscribed data for the accessibility-layered communication service by use of a private key, as configured for a private display of the subscribed data, the private display being intended for a user and being inaccessible to the spectators, wherein the lighthouse structure broadcasts the private display based on the private display control message; and sending the public display control message and the private display control message to the lighthouse structure such that the multi-layered information comprising the public display and the private display is delivered to respectively intended audiences.

16. The system of claim 15, wherein the subscribed data for the accessibility-layered communication service configured for the private display may be selected from a message to the user, cognitive navigation data for the user recommending destinations/routes well accepted by other users having the same personality type as the user, subscribed event details from the event input, and combinations thereof.

17. The system of claim 15, further comprising:

receiving, by another processor of a display controller for the lighthouse structure, the public display control message and the private display control message responsive to the sending; and broadcasting the public display and the private display based on respective display configuration customized for the lighthouse structure.

18. The system of claim 15, wherein the lighthouse structure is equipped with a plurality of visual display equipment for the public display and a signal transmitter for the private display, the visual display equipment selected from a screen, a light board, a strobe, a sparkle lighting, and combinations thereof.

19. The system of claim 15, further comprising:

accepting, by a processor of a user device for the user, the private key responsive to pushing the private key to the user device by the lighthouse server;

acquiring the private display responsive to broadcasting of the private display by the lighthouse structure; and decoding the private display by use of the private key such that the private display is made accessible for the user.

20. The system of claim 19, wherein the user device may be an eyewear type wearable device through which the user looks at the lighthouse structure in order to see the private display in a hyperspectral bandwidth that is not visible without the user device, a set of a receiver and a screen, wherein the receiver captures hyperspectral images of the private display and exhibits the private display as decoded in visible bandwidths for the user, and combinations thereof.

* * * * *